Patented Aug. 6, 1929.

1,723,453

UNITED STATES PATENT OFFICE.

BALTZAR CARL von PLATEN, CARL GEORG MUNTERS, AND SIGURD MATTIAS BÄCKSTRÖM, OF STOCKHOLM, SWEDEN, ASSIGNORS TO ELECTROLUX SERVEL CORPORATION, OF NEW YORK, N. Y., A CORPORATION OF DELAWARE.

REFRIGERATION.

Original application filed June 3, 1927, Serial No. 196,179, and in Sweden June 9, 1926. Divided and this application filed March 3, 1928. Serial No. 258,964.

This application is a division of our copending application Serial No. 196,179 filed June 3, 1927.

Our invention relates to the art of refrigeration and relates particularly to that type of absorption system wherein a constant total pressure is maintained throughout. In such a system refrigeration is usually effected by the diffusion of the refrigerant into a gas which is inert with respect to the refrigerant. In apparati of this type, there is usually an excess of undiffused refrigerant leaving the evaporator. It is difficult to supply just the right amount of fluid to a system of this type for complete diffusion without any liquid refrigerant leaving the evaporator. The present invention contemplates an excess of liquid refrigerant leaving the evaporator proper and subsequent utilization of the latent heat of vaporization of such excess.

Figure 1:
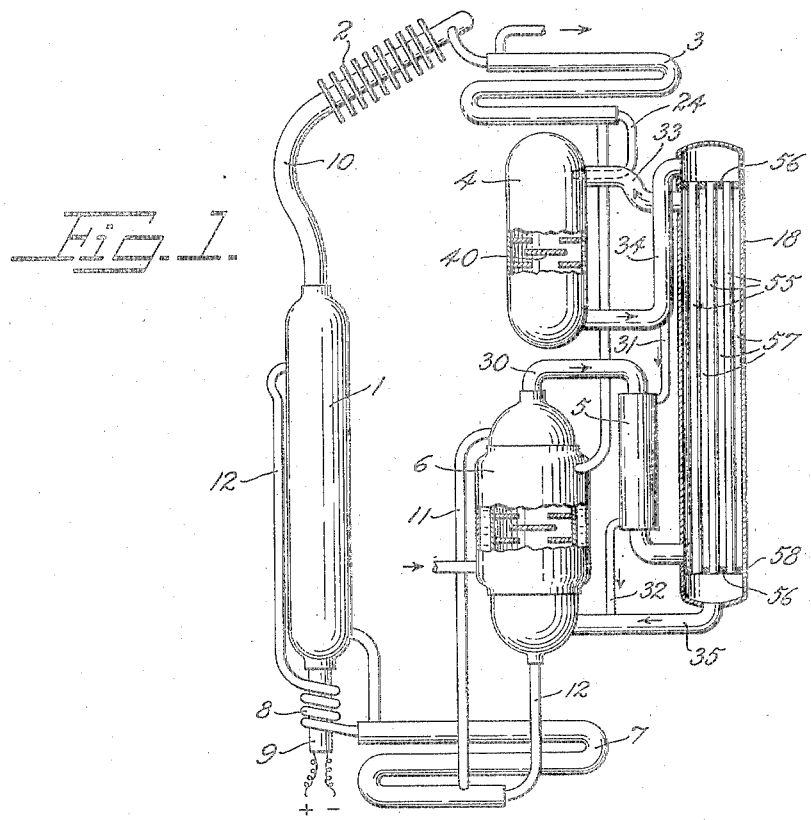
Figure 2:
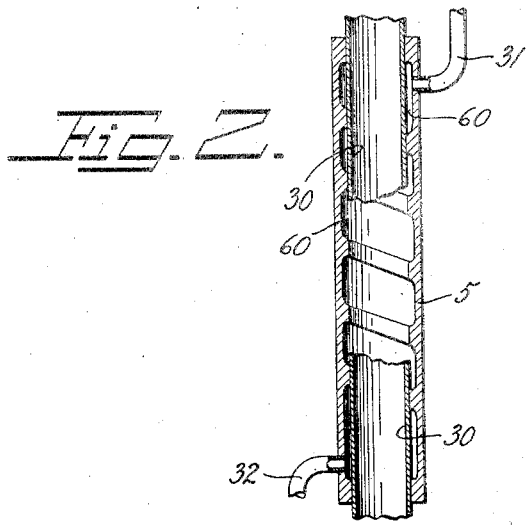

One object of the present invention is the utilization of excess undiffused refrigerant to obtain low pressure in the system. This and other objects will be apparent from the following description taken in connection with the accompanying drawing of which:

Fig. 1 shows an embodiment of the invention in a refrigerating apparatus of the absorption type employing an auxiliary pressure equalizing medium; and Fig. 2 is an enlarged sectional view of a part of the apparatus in Fig. 1.

Referring more particularly to Fig. 1 reference character 1 designates a generator wherein is contained a refrigerant or cooling agent in solution in an absorption liquid. For convenience in reference let it be assumed that the refrigerant is ammonia and the absorption liquid is water. Generator 1 is heated in any convenient way, as for instance, by the electrical resistance coil 9. The heat thus applied to the generator and its contents drives the ammonia out of solution. The gaseous ammonia passes upwardly through conduit 10 to the air cooled rectifier or radiator 2 where any entrained water vapor is condensed and flows by gravity back to the generator. The ammonia vapor free from water passes into condenser 3 where it is cooled by cooling water or other means and is liquefied. The liquid ammonia flows downwardly through condenser 3 to the upper part of the primary evaporator 4, which is the ordinary or regular evaporator of the type of system dealt with in Patent No. 1,609,334 of December 7, 1926. An auxiliary agent, a gas inert with respect to ammonia, for instance hydrogen, also enters the top of the evaporator 4 through conduit 33. The ammonia diffuses into the hydrogen, producing refrigeration. Diffusion and evaporation in the evaporator are aided by disks 40 placed therein.

The mixture of ammonia and hydrogen formed in the evaporator has a greater specific weight than the relatively pure hydrogen which enters the evaporator at the top. The mixture of gaseous ammonia and hydrogen and excess liquid ammonia that has not evaporated passes downwardly through the evaporator 4 and through conduit 34 to and through heat exchanger 18 and thence through conduit 35 to the lower part of absorber 6. Absorption liquid which contains but little ammonia in solution enters the top of the absorber 6 through conduit 11 and falls down over disks placed therein which may be similar to the disks in the evaporator and comes in contact with the ammonia-hydrogen mixture. The ammonia is absorbed by the absorption liquid and the hydrogen remains. This comparatively pure hydrogen is lighter than the ammonia-hydrogen mixture and passes upwardly through the absorber and through conduit 30 and through heat exchanger 18 and through conduit 33 to the upper part of the evaporator.

A continuous circulation of hydrogen takes places through the evaporator and absorber due to differences in specific weight of vertically extending bodies of the mixture of ammonia and hydrogen on the one hand and the relatively pure hydrogen on the other hand.

The absorption liquid which contains ammonia in solution passes out of the bottom of absorber 6 through conduit 12, a portion of which is arranged as a coil 8 around the heating element 9 so as to form a thermosyphon. This thermo-syphon causes the liquid to flow upwardly through conduit 12 from which it is discharged into the upper part of the generator 1 at a level of liquid above that maintained in the absorber 6. In the generator the ammonia is driven out of solution as previously described and thus completes the cycle. The absorption liquid flows downwardly through the generator and through conduit 11 to the top of the absorber and thus its cycle is completed. This flow of the absorption liquid takes place because the thermo-syphon member 8 maintains a level of liquid in the generator above the point of discharge from conduit 11 into the absorber 6. Conduits 11 and 12 may be arranged in heat exchange relation as indicated at 7 so that the hot liquid which comes from the generator will be cooled before it enters the absorber while at the same time the relatively cold liquid which comes from the top of the absorber is heated before it enters the thermo-syphon.

Heat exchanger 18 comprises two heads 56 through and between which extend tubes 55. The space around the tubes indicated by reference character 57 is a part of the path of flow of relatively pure hydrogen from the absorber to the evaporator. The mixture of gases passes through conduit 34 and through the tubes 55 and thence through conduit 35. The gases in tubes 55 cool the relatively pure hydrogen in space 57. A small drain hole 58 is provided in lower tube head 56.

A short distance from the evaporator conduit 34 makes an upward bend. Communicating with conduit 34 at this point is a conduit 31 through which the excess unevaporated refrigerant liquid passing out of the primary evaporator and a portion of the gaseous ammonia-hydrogen mixture flows to the top of a secondary evaporator 5. Secondary evaporator 5 comprises a hollow cylindrical member on the inside of which is formed a spiral groove 60. The cylinder fits securely over and is welded to the downwardly extending portion of conduit 30 and thus a spiral path is provided in which the ammonia evaporates in the presence of hydrogen. The gaseous ammonia-hydrogen mixture passes through conduit 32 to conduit 35 through which it passes to the absorber.

It will be evident that other embodiments of the invention than that shown and described are possible within the scope of the invention.

Having thus described our invention what we claim is:

1. Refrigerating apparatus comprising a generator, a condenser, a primary evaporator, an absorber, conduits connecting said absorber, generator, condenser and primary evaporator, a secondary evaporator and a heat exchanger connected in parallel between said primary evaporator and said absorber and means to conduct fluid from said absorber through said heat exchanger and into said primary evaporator.

2. Refrigerating apparatus comprising a generator, a condenser, a primary evaporator, an absorber, conduits connecting the aforementioned parts for conducting fluid therebetween, said conduits including a conduit for conducting gaseous fluid from the upper part of the absorber to the evaporator, said last-mentioned conduit having a downwardly extending portion, a secondary evaporation member in heat exchange relation with said downwardly extending portion and means for conducting liquid refrigerant to said secondary evaporation member and for conducting gaseous fluid therefrom to the absorber.

3. Refrigerating apparatus comprising a generator containing refrigerant in solution, a condenser, means to conduct gaseous fluid from the generator to the condenser, an evaporator comprising a cylindrical member, a spiral passageway on the inside surface of said cylindrical member, a tube passing through said cylindrical member, means to conduct liquid refrigerant from said condenser to said evaporator, an absorber, means to circulate gaseous fluid between and through the absorber and the evaporator and means to circulate absorption liquid between the absorber and generator.

4. Refrigerating apparatus comprising a generator, a condenser, a primary evaporator, an absorber, conduits connecting the aforementioned apparatus for conducting fluid therebetween, said conduits including a conduit for conducting gaseous fluid from the upper part of the absorber to the evaporator, said last-mentioned conduit having a downwardly extending portion, a secondary evaporation member in heat exchange relation with said downwardly extending portion, means for conducting liquid refrigerant and gas from said primary evaporator to said secondary evaporation member and means for conducting gaseous fluid from said secondary evaporation member to said absorber.

In testimony whereof, we hereunto affix our signatures.

BALTZAR CARL von PLATEN.
CARL GEORG MUNTERS.
SIGURD MATTIAS BÄCKSTRÖM.